(12) United States Patent
Howold et al.

(10) Patent No.: US 11,530,734 B2
(45) Date of Patent: Dec. 20, 2022

(54) ENERGY GUIDE CHAIN AND ROLLER MODULE

(71) Applicant: igus GmbH, Cologne (DE)

(72) Inventors: Philip Howold, Frechen (DE); Sean McCaskill, Charlotee, NC (US)

(73) Assignee: IGUS GMBH, Cologne (DE)

( * ) Notice: Subject to any disclaimer, the term of this patent is extended or adjusted under 35 U.S.C. 154(b) by 502 days.

(21) Appl. No.: 16/489,240

(22) PCT Filed: Feb. 27, 2018

(86) PCT No.: PCT/EP2018/054728
§ 371 (c)(1),
(2) Date: Aug. 27, 2019

(87) PCT Pub. No.: WO2018/154129
PCT Pub. Date: Aug. 30, 2018

(65) Prior Publication Data
US 2020/0014186 A1 Jan. 9, 2020

(30) Foreign Application Priority Data
Feb. 27, 2017 (DE) ...................... 20 2017 101 099.6

(51) Int. Cl.
*F16G 13/16* (2006.01)
*F16G 13/18* (2006.01)
(Continued)

(52) U.S. Cl.
CPC ............. *F16G 13/16* (2013.01); *F16G 13/18* (2013.01); *F16L 3/015* (2013.01); *H02G 11/006* (2013.01); *H02G 3/0475* (2013.01)

(58) Field of Classification Search
CPC ....... F16G 13/16; F16G 13/18; H02G 3/0475; H02G 11/006; F16L 3/015
See application file for complete search history.

(56) References Cited

U.S. PATENT DOCUMENTS

| 4,462,565 A | 7/1984 | Johnson |
| 4,771,901 A | 9/1988 | Griswold et al. |

(Continued)

FOREIGN PATENT DOCUMENTS

| CN | 1840936 | 10/2006 |
| CN | 104508325 | 4/2015 |

(Continued)

OTHER PUBLICATIONS

Office Action from related Japanese Appln. No. 2019-546158, dated Dec. 1, 2020. English translation attached.

(Continued)

*Primary Examiner* — Zachary L Kuhfuss
(74) *Attorney, Agent, or Firm* — Grossman, Tucker, Perreault & Pfleger, PLLC (57) ABSTRACT

A cable carrier for accommodating and guiding cables, comprising parallel first link strands of opposing first links which are connected to each other by means of first cross stays, wherein outside at least one first link strand and parallel to this a second link strand of second links is arranged, which are opposite the first links of the adjacent first link strand and of which at least some are connected by way of second cross stays to the opposite first links, and wherein, between at least some of the opposing first and second links, rollers are arranged which project beyond the first and second links on at least one side of the cable carrier perpendicular to the first and second cross stays.

25 Claims, 5 Drawing Sheets

(51) Int. Cl.
*F16L 3/015* (2006.01)
*H02G 11/00* (2006.01)
*H02G 3/04* (2006.01)

(56) References Cited

U.S. PATENT DOCUMENTS

| | | | |
|---|---|---|---|
| 6,745,555 | B2 | 6/2004 | Hermey et al. |
| 6,997,412 | B2 | 2/2006 | Komiya |
| 7,444,800 | B2 | 11/2008 | Hermey |
| 8,459,000 | B2 * | 6/2013 | Harada ............... F16G 13/16 59/78.1 |
| 9,163,699 | B2 | 10/2015 | Jaeker |
| 9,188,194 | B2 | 11/2015 | Hermey |
| 9,776,798 | B2 | 10/2017 | Diebel et al. |
| 10,309,488 | B2 | 6/2019 | Kemper et al. |
| 2006/0219421 | A1 | 10/2006 | Kitagawa |
| 2018/0320757 | A1 | 11/2018 | Tetsuka |

FOREIGN PATENT DOCUMENTS

| | | | |
|---|---|---|---|
| CN | 104976283 | 10/2015 | |
| CN | 105020337 | 11/2015 | |
| DE | 1170201 | 5/1964 | |
| DE | 29821259 | 6/1999 | |
| DE | 19839270 | 11/1999 | |
| DE | 19851340 | 3/2000 | |
| DE | 102004038817 | 3/2005 | |
| DE | 102006027246 | 12/2007 | |
| DE | 202012003908 | 7/2012 | |
| DE | 102012106400 | 1/2013 | |
| DE | 102012109696 | 4/2014 | |
| DE | 102012113082 | 6/2014 | |
| DE | 202014104550 | 10/2014 | |
| EP | 2010800 | 1/2009 | |
| GB | 2514755 A * | 12/2014 | ............ F16G 13/18 |
| JP | 2001-221293 | 8/2001 | |
| JP | 2010-127396 | 6/2010 | |
| JP | 2010-228904 | 10/2010 | |
| KR | 10-0517779 | 9/2005 | |
| KR | 20-0465244 | 2/2013 | |
| WO | 2017/086134 | 5/2017 | |

OTHER PUBLICATIONS

Search report from related Chinese Appln. No. 201880014332.1, dated Aug. 20, 2020.

English translation of the International Search Report from corresponding PCT Appln. No PCT/EP2018/054728, dated Jun. 25, 2018.

English translation of the International Preliminary Report on Patentability from corresponding PCT Appln No. PCT/EP2018/054728, dated Aug. 27, 2019.

Search report from corresponding German Appln. No. 20 2017 101 099.6, dated Oct. 23, 2017.

* cited by examiner

ENERGY GUIDE CHAIN AND ROLLER MODULE

FIELD

The invention concerns an energy guide chain for accommodating and guiding energy and information transmission lines, in particular cables and hoses, which has parallel first plate rows comprising opposite first plates, wherein the plates of each plate row are hingedly connected together and at least some of the opposite first plates are connected together by first transverse limbs, and which laterally outside the first plate rows has rollers which project beyond the plates at a side of the energy guide chain, that faces perpendicularly to the first transverse limbs.

The invention further concerns a roller module comprising a holding means and rollers mounted thereon for lateral releasable fixing at the outside of a first plate of an energy guide chain of the above-indicated kind.

BACKGROUND

An energy guide chain of the above-indicated kind can be used in particular for displacement on a support surface or in a channel by means of the rollers. In that case a moveable end of the run which is disposed on the support surface by way of the rollers can be connected to a vehicle which displaces the moveable end of the energy guide chain to a station at which the lines can be connected to an energy consumer and/or information receiver. The moveable free end of the energy guide chain can also be connected to a moveable energy consumer and/or information receiver.

The run which rests on the support surface by way of the rollers and is displaceable thereon can be accommodated in a storage region for storage of the length of the energy guide chain, that is to be paid out, and can be delivered therefrom. The length of the energy guide chain, that is to be paid out, can be rolled up and unrolled in the storage region in or on a kind of drum. In another arrangement the length of the energy guide chain, that is to be paid out, can be arranged in the storage region in loop form with at least one direction-changing arc and an upper run which is arranged above the run that rests on the support surface by way of the rollers.

An energy guide chain of the kind set forth in the opening part of this specification is known from DE 20 2014 104 550 U1. That publication further discloses a roller module of the kind indicated in the opening part of this specification. The roller module has a holding means in the form of a carrier body and a support roller mounted in the carrier body by way of a spindle arranged perpendicularly to the longitudinal direction and to the height direction of the chain plate. The spindle is connected to or supported in the carrier body only in the one end region of the spindle. The carrier body is in turn arranged at the outside of a link side plate of the energy guide chain and is connected to the plate by way of clips engaging over the lower and upper narrow sides thereof.

If the support rollers known from DE 20 2014 104 550 U1 and the spindles thereof are loaded by the weight of the energy guide chain then flexural or buckling forces occur at the spindles of the support rollers, and they can lead to deviations in respect of the spindles from the horizontal transverse direction.

SUMMARY

The object of the present invention is to provide an energy guide chain and a roller module which can be arranged on an energy guide chain, which ensures very substantial stability of the position and mounting of the rollers even in the event of a heavy load acting on the rollers and the spindles thereof.

According to the invention an energy guide chain for accommodating and guiding energy and information transmission lines, in particular in the form of cables and hoses, has parallel first plate rows of opposite first link plates, wherein the first plates of each first plate row are hingedly connected together and at least some of the opposite first plates are connected together by first transverse limbs. Arranged outside at least one first plate row and parallel thereto is a second plate row comprising hingedly interconnected second plates which are opposite the first plates of the adjacent first plate row and of which at least some are connected by way of second transverse limbs to the respectively opposite first plates. Disposed between some of the opposite first and second plates are rollers which project beyond the first and second plates at at least one side of the energy guide chain, that faces perpendicularly to the first and second transverse limbs.

Arranging the second plate row outside the first plate row means that the second plate row is arranged outwardly with respect to the internal space in the energy guide chain, that extends between the first plate rows. Hereinafter terms like "outside", "inside", "inner" and "outer" always refer to the internal space in the energy guide chain. By virtue of the fact that the rollers are disposed in the intermediate space between the opposite first and second plates the rollers upon displacement are protected in relation to lateral obstacles as the rollers do not project laterally outwardly in an exposed condition.

In a preferred configuration of the energy guide chain according to the invention directly adjacent plates of the first and second plate rows are pivotable relative to each other from their position of being substantially straight in the longitudinal direction of the energy guide chain in a first pivotal direction over an angle $\alpha \neq 0°$ so that in that case the energy guide chain is bendable to form a first arc and is pivotable in a second pivotal direction opposite to the first pivotal direction over a pivotal angle $\beta > 0°$, wherein $\alpha > \beta$. According to the invention it can be provided that the rollers project beyond the first and second plates at the outside of the energy guide chain which is bendable to form the first arc. The rollers can in particular project radially outwardly at the outside in relation to the direction-changing arc so that even with a high line weight the energy guide chain can move without wear on the respective support surface.

The energy guide chain according to the invention can also be prestressed in that, instead of being displaced from a substantially straight position relative to each other, the adjacent plates can be moved from a position of being unwound in the first pivotal direction, generally in the non-loaded state, and the pivotal movement in the opposite pivotal direction is blocked.

The energy guide chain is preferably so designed that it can rest or move on the support surface with the rollers, with a run at the outside of the energy guide chain (its underside) which is bendable to afford the first arc.

The first and second plates are preferably of the same height.

The side of the second plates that faces away from the underside (being therefore the top side) can be arranged at at least the same height as the top sides of the first plates. With this arrangement, the energy guide chain can slide with an upper run on the lower run which rests on the support surface by way of the rollers, over the upper narrow sides of the second plates and possibly also the first plates, or, if the rollers in addition to projecting at the outside also project beyond the upper narrow sides or alternatively only at the top side, they can provide roller support. In an alternative configuration the top sides of the first and second plates can also be of differing heights. Optionally then the top run can slide or roll on the top sides either of the first plate or the second plate.

The diameter of the rollers can be greater than the height of the first or second plates. Preferably the diameter of rollers is greater than or equal to the height of the first or second plates and less than or equal to double the height of the first or second plates.

The first plates connected to the second transverse limbs can have fixing portions which cooperate with fixing portions arranged at the second transverse limbs, for releasable connection to the second transverse limbs.

The second plates connected to the second transverse limbs can have fixing portions cooperating with fixing portions arranged at the second transverse limbs, for releasable connection to the second transverse limbs.

The fixing portions of the first and second plates and the fixing portions of the second transverse limbs can be respectively identical.

The first plates connected by the first transverse limbs can have fixing portions cooperating with fixing portions arranged at the first transverse limbs, for releasable connection to the first transverse limbs.

The fixing portions of the first and second plates for the first and second transverse limbs and the fixing portions of the first and second transverse limbs can be respectively identical. This means that plates of the same configuration with fixing portions at both sides can be used for the first plates of the first plate rows while standard plates can be used for the second plates for an energy guide chain consisting of two plate rows, which standard plates unlike the first plates have only inward fixing portions. Standard transverse limbs of possibly differing length can be used as the first and second transverse limbs.

The second plates of the second plate row can however, besides their fixing portions for fixing the second transverse limbs, have further fixing portions for fixing external transverse limbs for coupling a further energy guide module comprising first plates and first transverse limbs, in which case then the second plates, like the first plates, are provided with fixing portions at both sides. A roller module can in turn be coupled to that energy guide module.

The first and second plates can have cranked overlap regions with the directly adjacent plates. The oppositely disposed first plates of the two first plate rows in that case can be so arranged that an inwardly and an outwardly cranked overlap region are respectively disposed in opposite relationship. The second plates, disposed opposite the first plates, of one of the second plate rows can be so arranged that the inwardly cranked and the outwardly cranked overlap regions of the first and second plates respectively lie in mutually opposite relationship while the second plates of the other second plate row are so arranged that the inwardly cranked overlap regions of the first plates and the outwardly cranked overlap regions of the second plates as well as the outwardly cranked overlap regions of the first plates and the inwardly cranked overlap regions of the second plates are in opposite relationship.

In a preferred development of the invention the roller is mounted in a holding means which is in the form of a yoke with two limbs which are parallel to the plates and between which the roller is arranged, and which are connected together in a first end region by a connecting limb. Additionally or alternatively, the roller can also be mounted in or at the second plate and the oppositely disposed first plate.

The holding means can form a second transverse limb between a first plate and a second plate opposite thereto. In the region of the connecting limb and/or in a second end region of the parallel limbs, that is opposite to the first end region, the holding means can have fixing portions cooperating with the fixing portions of the first and second plates arranged laterally of the holding means.

The first and second plates having rollers arranged therebetween can be connected together at the side (top side) which is opposite the side (bottom side) at which the rollers project outwardly, by a substantially straight second transverse limb.

In that case the roller can be mounted in a holding means which is supported inwardly on the substantially straight second transverse limb and which is fixed at the oppositely disposed first and second plates. For fixing purposes, the holding means can respectively engage over the side (underside) of the first and second plates, at which the roller projects outwardly, and can be supported at that side. Support can be afforded by two parallel limbs, between which the roller is arranged and which are supported with an end region on the second transverse limb. In its other end region, the limbs can respectively have an outwardly angled region, wherein the angled regions bear against the top side of the first and second plates.

The holding means can be in the form of a yoke with two lateral limbs which are parallel to the plates and which are connected together by a connecting limb in a first end region and which in a second end region opposite the first end region respectively have an outwardly angled region, wherein the connecting limb is supported on the inside of the substantially straight transverse limb and the angled regions bear against the underside of the first and second plates.

The angled regions can be fixed by means of screws at the underside of the first and second plates.

In an alternative configuration the angled regions can bear without fixing means against the undersides of the first and second plates, in which case provided beneath the angled region engaging over the first plate is a fixing element for the holding means at the adjacent first or second plate. The fixing element can have a fixing portion which is of an identical configuration to the fixing portion of the second transverse limb and can be fixed to the fixing portion of the first plate. Preferably also there is provided a fixing element having a fixing portion for the second plate, wherein the fixing element in turn has a fixing portion which is of an identical configuration to the fixing portion of the second transverse limb and can be fixed to the fixing portion of the second plate.

In a corresponding fashion, at least one of the second end regions of the lateral limbs of the yoke-shaped holding means can have an opening, through which the respective fixing element extends and secures the angled regions to prevent lateral displacement relative to the first and second plates respectively.

The fixing portions of the first and/or second transverse limbs, in the region in which they bear against the respective plates, can have lateral broadening portions which extend in the longitudinal direction of the plates and which at least at one side project beyond the overlap region of the directly adjacent plate. In that way the directly adjacent plates are secured to prevent displacement directed transversely with respect to the longitudinal direction of the plates.

In addition, for ensuring lateral stability of the plate rows, it is preferably provided that the plates have at least one projection facing in the longitudinal direction and have a region of undercut configuration, wherein the projection of a plate engages into the undercut region of a directly adjacent plate over at least a part of the pivotal angle. Preferably in that respect the immediately adjacent plates are locked over the entire pivotal angle to prevent transversely directed separation.

According to the present invention the roller module, for lateral fixing to an energy guide chain which has parallel plate rows comprising oppositely disposed first plates, wherein at least some of the oppositely disposed plates are connected together by way of transverse limbs, has a second plate which is suitable as a plate of an energy guide chain comprising two plate rows, and a roller mounted in a holding means, wherein the holding means is connected to the second plate and has fixing means for releasable fixing to a first plate of the energy guide chain, that is opposite to the second plate, and the roller projects beyond the second plate in a direction facing parallel to the second plate.

The diameter of the roller can be greater than the height of the second plate and the holding means. Preferably the diameter of the roller is greater than or equal to the height of the second plate and less than or equal to double the height of the second plate.

The holding means can be in the form of a yoke, having two limbs which are parallel to the first and second plates and between which the roller is arranged and which are connected together by a connecting limb in a first end region.

The holding means can form a transverse limb which can be arranged between the first plate of the energy guide chain and the second plate of the roller module. In the region of the connecting limb the holding means can have a fixing portion, with which it can be releasably fixed to a fixing portion of the first plate. Additionally or alternatively, in an end region of the limbs, that is remote from the first end region, the holding means can have a fixing region with which it can be releasably fixed to a fixing portion of the first plate.

The roller module can have a transverse limb which extends straight substantially transversely relative to the second plate and which in a first end region is connected to the second plate and in a second end region has a fixing portion for releasable fixing to the first plate of the energy guide chain, that is opposite to the second plate.

The transverse limb can be arranged in a region of the second plate, that is opposite to the side (underside) of the second plate, at which the roller projects.

The transverse limb can also have in its first end region a fixing portion which can be releasably fixed to a fixing portion on the second plate. In that arrangement the two fixing portions in the first and second end regions of the transverse limb can be of an identical configuration.

The roller can be mounted in a holding means which is supported inwardly on the transverse limb and is connected to the second plate and has fixing means for connection to an oppositely disposed first plate of an energy guide chain. For that purpose the holding means can have a region which engages over the side (underside) of the second plate, at which the roller projects outwardly, and is supported at that side. Opposite that region the holding means can have a further region suitable for engaging over the underside of an oppositely disposed first plate of an energy guide chain and for being supported at that side.

The holding means can have two parallel limbs which extend in the heightwise direction of the second plate and between which the roller is arranged and which is supported on the transverse limb in a first end region facing towards the transverse limb while in a second end region it has an outwardly angled region for bearing against the underside of the second plate and the underside of an oppositely disposed first plate of an energy guide chain.

The holding means can be in the form of a yoke having two lateral limbs which are parallel to the second plate and which in a first end region are connected together by a connecting limb and in a second end region have an outwardly angled region, wherein the connecting limb bears against the inside of the transverse limb and the angled regions are adapted to bear against the underside of the second plate and the underside of the first plate of the energy guide chain, at which fixing of the roller module is provided.

The angled regions can have fixing means for fixing to the underside of the first and second plates.

At their first end regions the lateral limbs of the yoke can have projections which are extended in the longitudinal direction thereof and which project laterally beyond the transverse limb and bear against the ends of the transverse limb, that are perpendicular to the spindle of the roller.

The roller module according to the invention can have a fixing element for the holding means, which includes a fixing portion which is identical to the fixing portion of the transverse limb and can be fixed to a fixing portion of the first plate. In addition, there can be provided a second fixing element for the holding means, including a fixing portion which is identical to the fixing portion of the transverse limb and can be fixed to a fixing portion of the second plate.

At least one of the second end regions of the lateral limbs of the yoke can have an opening, through which the respective fixing element extends and secures the angled regions to prevent lateral transverse displacement relative to the second plate and the first plate, at which the fixing of the roller module is provided.

The fixing portions of the transverse limb and/or the fixing element for the holding means can have lateral broadening portions in regions at which they bear against the plates, which broadening portions project at least at one side beyond the overlap region of the immediately adjacent plate.

The second plate of a roller module can have at least one projection facing in its longitudinal direction and a region of undercut configuration, wherein the projection of a plate can engage into the undercut region of an immediately adjacent second plate over at least a part of the pivotal angle and in that case, can counteract transversely directed separation of the immediately adjacent plates.

The present invention further includes the use of a roller unit in an energy guide chain, having parallel first plate rows comprising oppositely disposed first link plates, wherein the first plates of each first plate row are hingedly connected together and at least some of the opposite first plates are connected together by first transverse limbs, and wherein arranged outside at least one first plate row and parallel thereto is a second plate row comprising hingedly interconnected second plates which are in opposite relationship to the first plates of the adjacent first plate row and of which at least some are connected by of second transverse limbs to the respectively opposite first plate, wherein the second transverse limbs in the heightwise direction of the plates are disposed in a lower region or in an upper region. The roller unit according to the invention has a holding means having two parallel limbs and a roller disposed between the limbs, wherein the limbs in a first end region respectively have a support means for bearing against the second transverse limb arranged between a first and a second plate, while in a second end region opposite the first end region they have a respective outwardly angled region for bearing against the sides, remote from the support means, of the first and second plates. The roller projects beyond the outwardly angled regions of the limbs.

The diameter of the roller can be greater than the height of the holding means. Preferably the diameter of the roller is greater than or equal to the height of the holding means or less than or equal to double the height of the holding means.

The roller can be arranged rotatably on a spindle fixed to or in the parallel limbs. Alternatively, the roller can be fixed on a spindle mounted rotatably in or on the parallel limbs.

The support means of the parallel limbs can be respectively in the form of an end recess in a first end region with projections at both sides extending in the longitudinal direction of the limbs. The bottom of the recess serves for contact of the limbs against a second transverse limb extending between a first plate of the energy guide chain and a second plate. The lateral projections serve to engage over the second transverse limb at its ends facing perpendicularly to the axis of the roller and to bear against same.

A connecting limb can extend at the height of the bottom of the recesses of the parallel limbs, which connecting limb can be brought into contact against the second transverse limb. The connecting limb can also extend without the recesses and the lateral projections of the parallel limbs between the first end regions of the limbs.

The two parallel limbs with their angled regions can be individual or, if they are connected together by a connecting limb, they can be provided jointly in the form of a shaped sheet metal portion.

The angled regions can have fixing means for fixing at the sides of the first and second plates, that are remote from the support means, for example with holes for fixing by means of screws.

For fixing at the first plate and the second plate opposite thereto the limbs in the transitional zone to the angled regions can have openings through which a fixing element can be inserted in the direction of the spindle of the roller for fixing the second end region of the limbs at the first and/or second plate respectively adjacent thereto.

The angled regions at one or both of their sides can have plates facing towards the first end region of the parallel limbs, which plates upon insertion of the fixing elements through the openings laterally engage over the fixing elements.

BRIEF DESCRIPTION OF THE DRAWINGS

Embodiments by way of example of the present invention are described in greater detail hereinafter with reference to the drawings.

DETAILED DESCRIPTION

Figure 1:
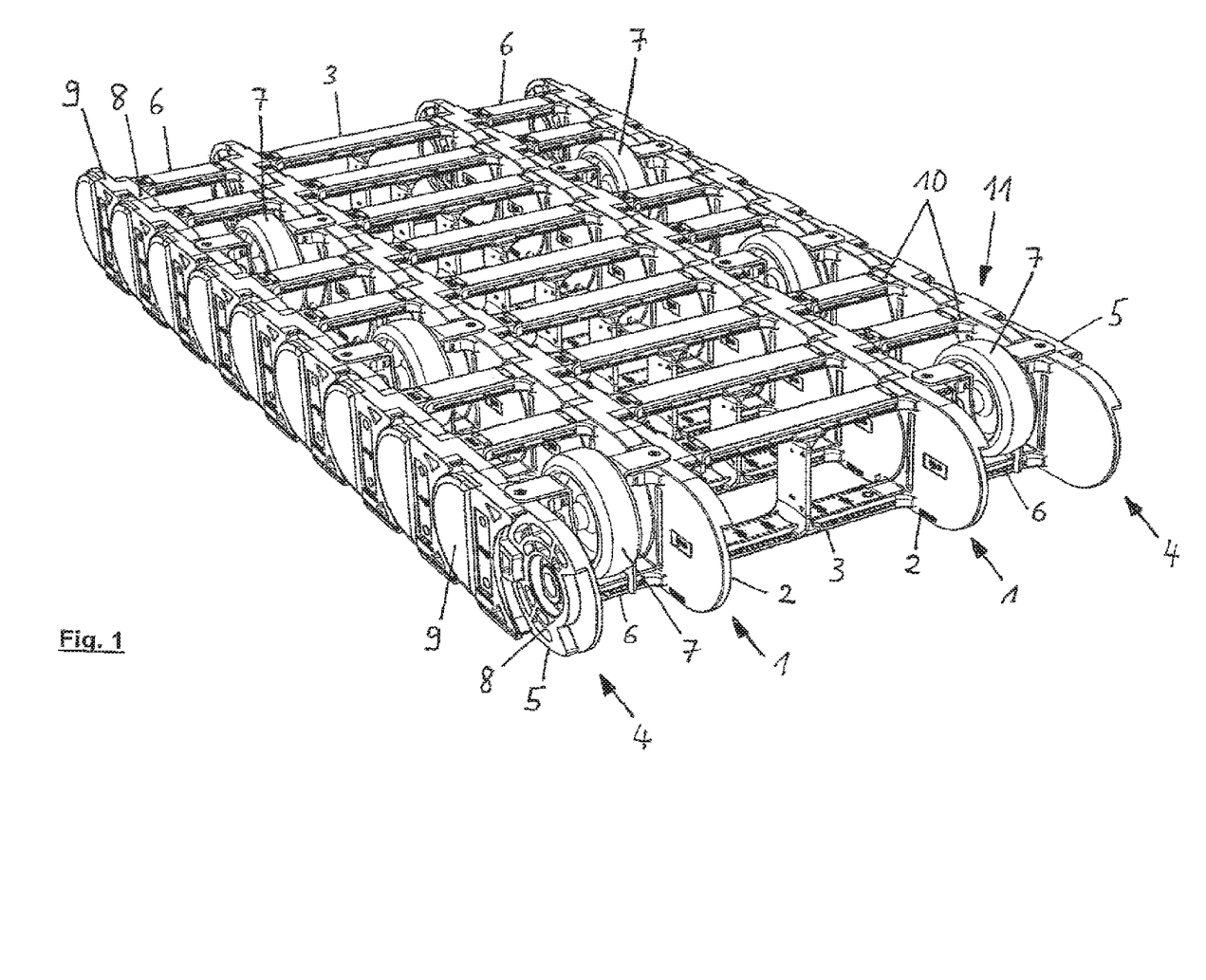
FIG. 1 shows a perspective view (from below) of a portion of a first embodiment of an energy guide chain.
Figure 3:
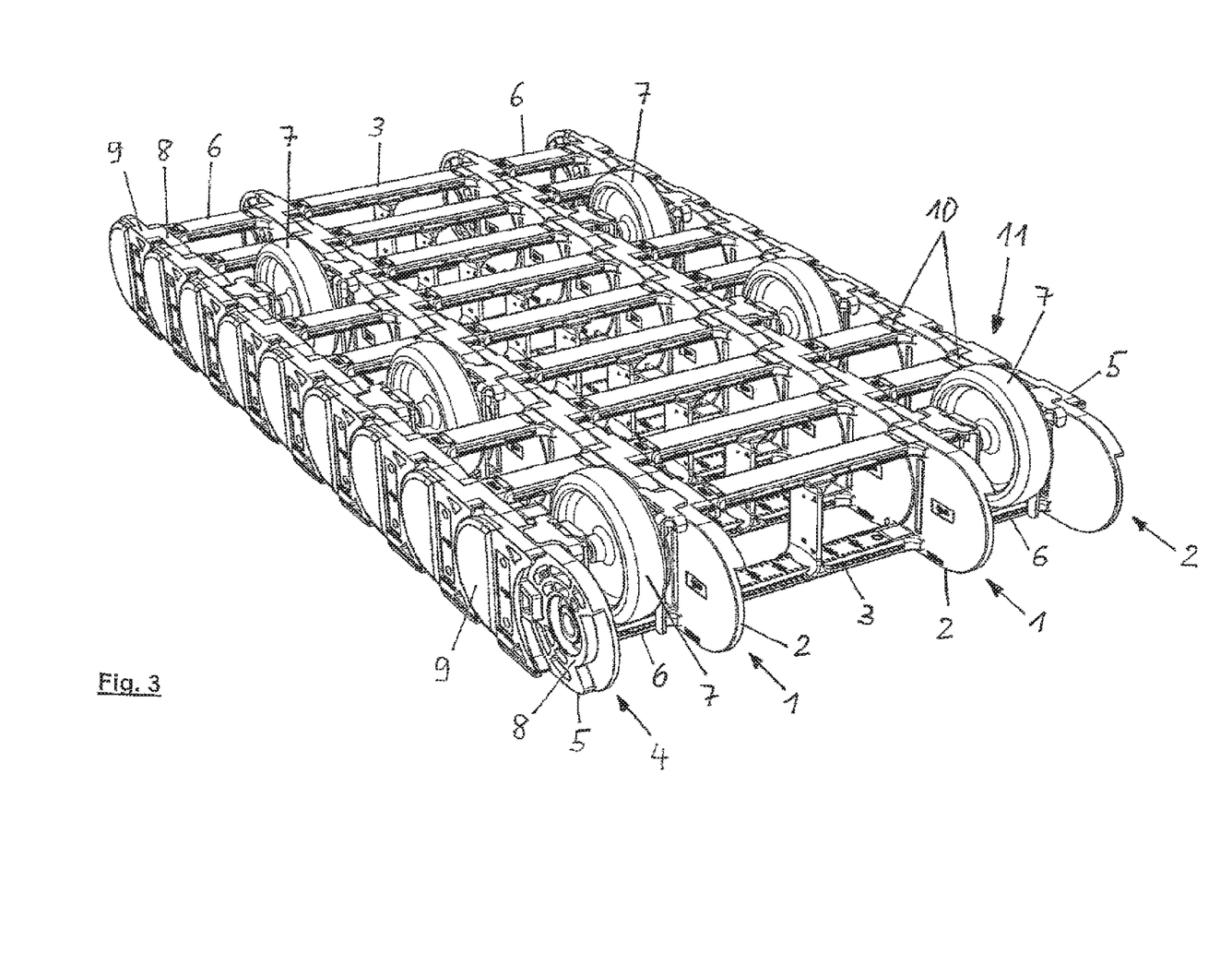
FIG. 3 shows a perspective view (from below) of a portion of a second embodiment of an energy guide chain.

The energy guide chains shown in FIGS. 1 and 3 (as a portion of a run) have parallel first plate rows 1 comprising oppositely disposed first link plates 2, wherein the first plates 2 of each first plate row 1 are hingedly connected together and the oppositely disposed first plates 2 are connected together by first transverse limbs 3. Arranged outside the first plate rows 1 and parallel thereto is a respective second plate row 4 comprising hingedly interconnected second plates 5 which are opposite to the first plates 2 of the adjacent first plate row 1 and are connected by way of second transverse limbs 6 to the respectively oppositely disposed first plates 2.

Arranged between the plates 2, 5 of each third pair of oppositely disposed first and second plates are rollers 7 which project beyond the first and second plates 2, 5 at at least one side (underside) of the energy guide chain, being the side facing perpendicularly to the first and second transverse limbs 3, 6.

The portions of energy guide chains, as shown in FIGS. 1 and 3, are portions of a run of the energy guide chains, which can roll at its underside with the rollers 7 on a support surface. In particular this involves energy guide chains whose immediately adjacent plates in the first and second plate rows 1 and 4 respectively are pivotable from their substantially straight position in the longitudinal direction of the energy guide chain over an angle different from zero, relative to each other, so that in that situation the energy guide chain is bendable to form an arc. At the outsides of the energy guide chain which is bendable to form the arc the rollers 7 project beyond the first and second plates 2, 5. The outside forms the underside of the run of the energy guide chain, that is respectively shown in FIGS. 1 and 3.

The first plates and the second plates 2, 5 are plates of identical size and involving the same pivotal angle. They have cranked overlap regions with the directly adjacent plates of a plate row. The oppositely disposed first plates 2 of the two first plate rows 1 are so arranged that an inwardly cranked overlap region 8 and an outwardly cranked overlap region 9 are respectively disposed in opposite relationship. The second plates 5, in opposite relationship to the first plates 2, of one of the second plate rows 4 are so arranged that the inwardly cranked and the outwardly cranked overlap regions 8, 9 of the first and second plates 2, 5 are respectively disposed in opposite relationship while the second plates 5 of the other second plate row 4 are so arranged that the inwardly cranked overlap regions 8 of the first plates 2 are opposite the outwardly cranked overlap regions 9 of the second plates 5 and the outwardly cranked overlap regions of the first plates 2 are opposite the inwardly cranked overlap regions 8 of the second plates 5.

The first plates 2 of the first plate rows 1 are of a identical configuration. The second plates 5 of the second plate rows 4 are of a mirror-image symmetrical configuration in their arrangement in the energy guide chain with respect to the plane extending in the center thereof and parallel to the plates. Accordingly, it is possible for the second plates 5 to use standard plates of an energy guide chain comprising two plate rows, being of mirror-image symmetrical configuration with respect to the parallel central plane thereof. Plates of a single type, that is to say of the same configuration, can be used as the first plates 2.

The first and second transverse limbs 3, 6, except for their differing length, are also of an identical configuration so that for the second transverse limbs it is possible to use standard transverse limbs, corresponding to the first transverse limbs 3, of an energy guide chain. In their two end regions they have identical fixing portions for releasable connection to the first and second plates 2 and 5 respectively.

For connection to the first and second transverse limbs 3 and 6 respectively, provided at the inward and outward sides of the first plates 2 are fixing portions cooperating with the fixing portions 10 of the first and second transverse limbs 3, 6. The fixing portions are in the form of pins (not shown in the drawing) which are latchable with the fixing portions 10 of the first and second transverse limbs 3, 6. The fixing portions for the first and second transverse limbs 3, 6 are respectively arranged centrally in opposite relationship at first plates 2 in the upper and lower regions thereof and are of the same configuration. The first plates 2 of both first plate rows 1 can thus be produced in the form of a single type of plate, as a special plate.

The second plates 5 at their insides have fixing portions (not shown in the drawing) for connection to the second transverse limbs 6 which are of the same configuration as the fixing portions of the first plates 2 and as in the case thereof are disposed centrally in the upper region and the lower region thereof.

The second transverse limbs 6 which are arranged in the region of the underside of the energy guide chain, at which the rollers 7 project, of the energy guide chain run shown in FIGS. 1 and 3, are recessed at each third chain link which accommodates a roller 7, while at the top side of the run, that is opposite to the underside, the oppositely disposed first and second plates 2, 5 respectively have a second transverse limb 6.

The inwardly and outwardly cranked overlap regions 8, 9 of the first and second plates 2, 5 can have hinge pins in an overlap region at the side of the adjacent cranked overlap region while in their other overlap region at the side facing towards the adjacent cranked overlap region they have hinge recesses for forming a hinge connection to respective directly adjacent plates as well as abutments and abutment surfaces cooperating therewith to limit the pivotal angle.

Instead of the second transverse limbs 6 at the underside, a holding means 11 having the roller 7 is used in each third chain link. As can be seen in particular from FIGS. 2 and 4 the holding means 11 is of a yoke configuration with two lateral limbs 12, 13 which are parallel to the respective first and second plates 2, 5 and which are connected together in a first end region by a connecting limb 14 and in a second end region opposite to the first end region respectively have an outwardly angled region 15, 16. The connecting limb 14 is supported on the inside of the respective second transverse limb 6 disposed in the region of the top side of the energy guide chain run shown in FIGS. 1 and 3. The angled regions 15, 16 bear against the underside of the oppositely disposed first and second plates 2, 5. The respective roller 7 is mounted rotatably on a spindle 17 fixed to the two parallel limbs 12 and 13.

Figure 2:
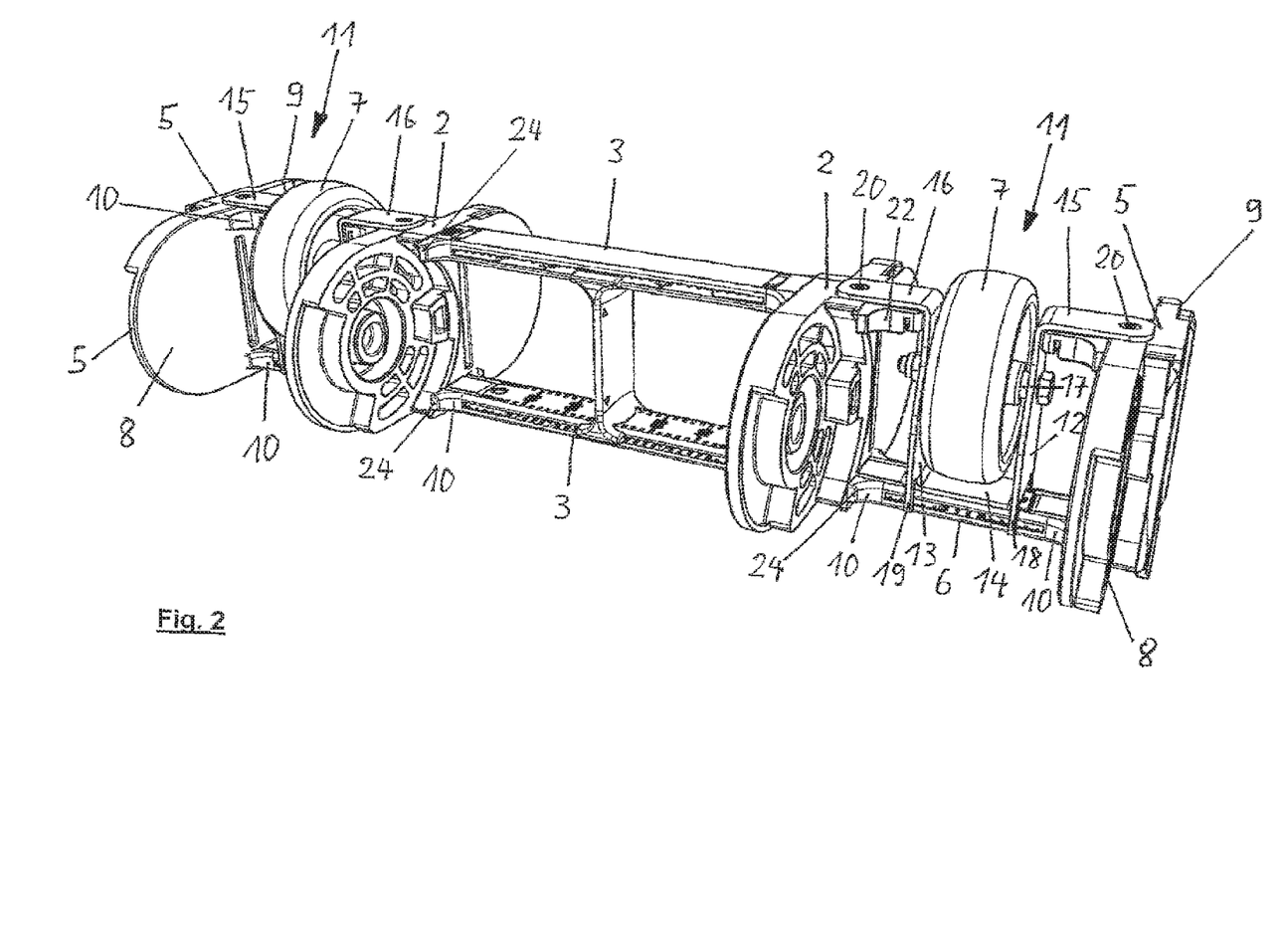
FIG. 2 shows a chain link with rollers of the energy guide chain shown in FIG. 1 as a perspective view (from below)
Figure 4:
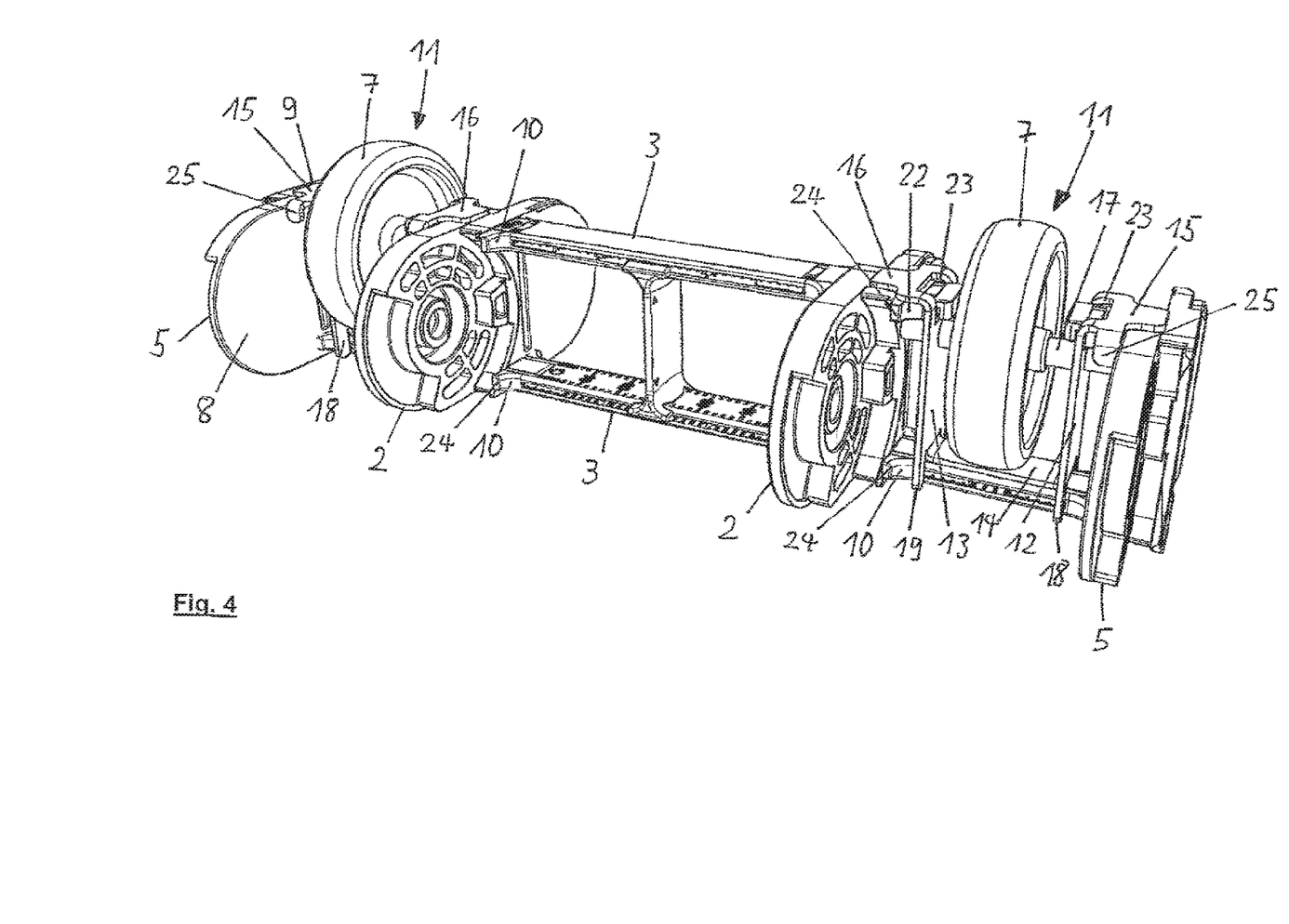
FIG. 4 shows a perspective view (from below) of a chain link with rollers of the energy guide chain shown in FIG. 3.
Figures 5, 6:
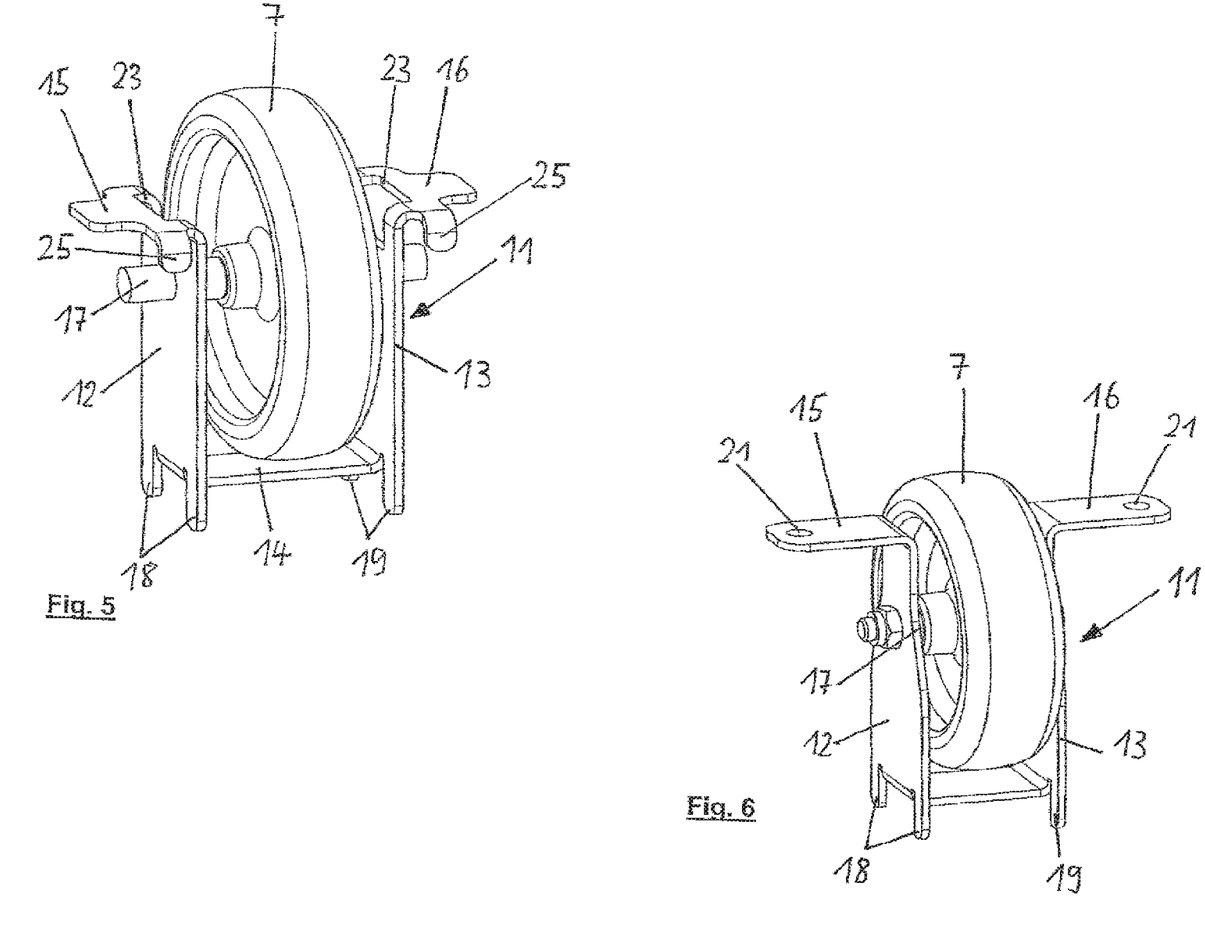
FIG. 5 shows a perspective view of a roller unit which can be inserted in the energy guide chain of FIG. 1.
FIG. 6 shows a perspective view of a roller unit which can be inserted in the energy guide chain of FIG. 3.

As can be seen from FIGS. 2 and 4 and in particular FIGS. 5 and 6 the parallel limbs 12 and 13 of the holding means 11, in the first end regions thereof, in which they are connected to the connecting limb 14, have projections 18 and 19 which are extended in the longitudinal direction thereof and project laterally beyond the connecting limb 14 and the transverse limb 6 and bear against the ends of the second transverse limb 6, that face perpendicularly to the spindle 17 of the roller 7.

In the embodiment shown in FIGS. 1, 2 and 6 the angled regions 15 and 16 are respectively fixed at the underside of the first and second plates 2, 5 by means of a screw 20 engaging through a corresponding hole 21 in the angled regions 15 and 16.

In the embodiment shown in FIGS. 3, 4 and 5 the angled regions 15 and 16 bear without fixing means against the undersides of the first and second plates 2, 5, wherein provided beneath the angled regions 15, 16 which engage over the first and second plates, there is a respective fixing element 22 for the holding means on the adjacent first or second plate 2 and 5 respectively. The fixing element 22 has a fixing portion 10 which is of the same configuration as the fixing portion 10 of the second transverse limb 6 and is fixed to the fixing portion of the first and second plate 2 and 5 respectively. For passing the fixing elements 22 through the two parallel limbs 12, 13 a respective opening 23 is provided in the second end region of the limbs 12, 13. The fixing element extending through the opening 23 secures the respective angled region 15 and 16 of the holding means 11, that is supported on the underside of the first and second plates 2 and 5 respectively, to prevent lateral displacement relative to the plate in question.

The fixing portions 10 of the first and second transverse limbs 3, 6 and of the fixing element 22, in the region of the contact thereof against the respective plates, have lateral broadening portions 24 which extend in the longitudinal direction of the plates and which project beyond a part of the overlap region 8 and 9 of the directly adjacent plate in order to secure the directly adjacent plates to prevent displacement directed transversely relative to the longitudinal direction of the plates.

In order additionally to secure the angled regions 15, 16 of the limbs 12, 13 to prevent displacement in the longitudinal direction of the first and second plates 2 and 5 respectively connected thereto the angled regions 15, 16, at a side facing in the longitudinal direction of the plates, respectively have a plate 25 which extends in a direction towards the connecting limb 14 and which engages laterally over the fixing element 22.

The respective component comprising a second plate 2, a second transverse limb 6, the above-described holding means 11 and the roller 7 mounted therein forms a roller module which can be fixed laterally to a chain link of an energy guide chain, that comprises oppositely disposed first plates 2 and first transverse limbs 3 connecting same.

In addition, the holding means 11 with the roller 7 mounted therein forms a roller unit which can be fitted into a component of an energy guide chain, that comprises two first plates 2 connected together by first transverse limbs 3, and a second plate 5 connected outside a first plate 2 to same by way of a second transverse limb 6.

LIST OF REFERENCES 1 first plate row
2 first plate
3 first transverse limb
4 second plate row
5 second plate
6 second transverse limb
7 roller
8 inwardly cranked overlap region
9 outwardly cranked overlap region
10 fixing portion
11 holding means
12 limb
13 limb
14 connecting limb
15 angled region
16 angled region
17 spindle
18 projection
19 projection 20 screw
21 hole
22 fixing element
23 opening
24 broadening portion
25 plate

What is claimed is:

1. An energy guide chain to accommodate and guide at least one of at least one energy transmission line or at least one information transmission line, comprising:
parallel first plate rows in which first plates are arranged oppositely,
wherein the first plates of each first plate row are hingedly connected together,
wherein first transverse limbs connect at least some of the opposite first plates of the first plate rows to each other,
wherein arranged outside, parallel and adjacent at least one of the first plate rows is a second plate row comprising hingedly interconnected second plates which are opposite the first plates of the adjacent first plate row,
wherein second transverse limbs connect at least some of the second plates to the opposite first plates,
wherein the energy guide chain has a plane extending in a center thereof and parallel to the first plate rows, and
wherein arranged between at least some of the second plates of the second plate row and the first plates of the adjacent first plate row, wherein the second plate row and the adjacent first plate row are at a same side of the plane, are rollers which project beyond the first and second plates at at least one side of the energy guide chain, that face perpendicularly to the first and second transverse limbs.

2. The energy guide chain according to claim 1, wherein directly adjacent plates of each of the first and second plate row are pivotable relative to each other from a position of being substantially straight in a longitudinal direction of the energy guide chain in a first pivotal direction over an angle $\alpha \neq 0°$ such that the energy guide chain is bendable to form a first arc and is pivotable in a second pivotal direction opposite to the first pivotal direction over a pivotal angle $\beta > 0°$, wherein $\alpha > \beta$ and wherein the rollers project beyond the first and second plates at the outside of the energy guide chain which is bendable to form the first arc.

3. The energy guide chain according to claim 1, wherein the first and second plates are of a same height.

4. The energy guide chain according to claim 1, wherein the first and second plates each have a height, respectively, and a diameter of the rollers is greater than or equal to the height of the first and/or second plates and less than or equal to double the height of the first and/or second plates.

5. The energy guide chain according to claim 1, wherein the first and/or second plates connected to the second transverse limbs have fixing portions which cooperate with fixing portions arranged at the second transverse limbs for releasable connection to the second transverse limbs.

6. The energy guide chain according to claim 1, wherein the first plates connected by the first transverse limbs have fixing portions which cooperate with fixing portions arranged at the first transverse limbs for releasable connection to the first transverse limbs.

7. The energy guide chain according to claim 1, wherein at least one roller of the rollers is mounted in a holding means which is in a form of a yoke, with two limbs which are parallel to the first and second plates and between which the roller is arranged, and which are connected together in a first end region by a connecting limb, wherein the holding means forms one of the second transverse limbs connecting one of the first plates and one of the second plates opposite thereto.

8. The energy guide chain according to claim 1, wherein the first and second plates having one of the rollers arranged therebetween are connected together by a second transverse limb at a side opposite to the side at which the roller projects outwardly.

9. The energy guide chain according to claim 8, wherein the roller is mounted in a holding means which is supported inwardly on the transverse limb and which is fixed at the opposite first and second plates.

10. The energy guide chain according to claim 9, wherein the holding means is in a form of a yoke, with two lateral limbs-which are parallel to the first and second plates and which are connected together in a first end region by a connecting limb, and which in a second end region opposite the first end region respectively have outwardly angled regions, wherein the connecting limb is supported on an inside by the second transverse limb and the angled regions bear against undersides of the first and second plates.

11. The energy guide chain according to claim 10 the angled regions are fixed by screws to the undersides of the first and second plates.

12. The energy guide chain according to claim 10 the angled regions bear without fixing means against the undersides of the first and second plates, wherein provided beneath the angled region engaging over the first plate is a fixing element for the holding means on an adjacent first or second plate, wherein the fixing element has a fixing portion which is of an identical configuration to the fixing portion of the second transverse limb and is fixable to the fixing portion of the first plate.

13. The energy guide chain according to claim 12 at least one of the second end regions of the parallel limbs of the holding means has an opening through which the respective fixing element extends and fastens the angled regions to prevent lateral displacement relative to the first or second plate respectively.

14. A roller module for lateral fixing to an energy guide chain having parallel first plate rows in which first plates are arranged oppositely, wherein the energy guide chain has a plane extending in a center thereof and parallel to the first plate rows, wherein at least some of the opposite first plates are connected together by transverse limbs, wherein the roller module has a second plate which is suitable for a second plate row of the energy guide chain and a roller mounted in a holding means, wherein the holding means is connected to the second plate and has a fixing means for releasable fixing to a first plate of one of the first plates of an adjacent first plate row of the first plate rows, that is in opposite relationship to the second plate, and the roller projects beyond the second plate in a direction facing parallel to the second plate, wherein the second plate row and the adjacent first plate row are at a same side of the plane.

15. The roller module according to claim 14, wherein the holding means is in a form of a yoke, with two limbs which are parallel to the second plate and between which the roller is arranged, and which are connected together in a first end region by a connecting limb, wherein the holding means forms a transverse limb which is arrangeable between the first plate of the energy guide chain and the second plate of the roller module.

16. The roller module according to claim 15, wherein at the first end regions the parallel limbs have projections which are extended in a longitudinal direction thereof and which project laterally beyond the transverse limb and which bear against ends of the transverse limb, that face perpendicularly to a spindle of the roller.

17. The roller module according to claim 15, wherein at one or more sides facing in a longitudinal direction the angled regions have plates facing towards the first end region of the parallel limbs and which are laterally engageable over the fixing elements.

18. The roller module according to claim 14, wherein the roller module has a transverse limb which extends transversely relative to the second plate and which in a first end region is connected to the second plate and in a second end region has a fixing portion for releasable fixing to a first plate of the first plates of the energy guide chain.

19. The roller module according to claim 18, wherein the first end region the transverse limb has a fixing portion releasably connected to a fixing portion at the second plate.

20. The roller module according to claim 18, wherein the roller is mounted in the holding means which is supported inwardly on the transverse limb and which is connected to the second plate and has fixing means for connection to an oppositely disposed first plate of an energy guide chain.

21. The roller module according to claim 20, wherein the holding means is in a form of a yoke, with two lateral limbs which are parallel to the second plate and which in a first end region are connected together by a connecting limb and in a second end region have outwardly angled regions, wherein the connecting limb bears against an inside of the transverse limb and the angled regions are to bear against a side of the first and second plates, at which the roller projects.

22. The roller module according to claim 21, wherein the angled regions have fixing means for fixing at the side of the first and second plates, at which the roller projects.

23. The roller module according to claim 21, wherein one of the angled regions bears without fixing means against the side of the second plate, at which the roller projects outwardly, and the other one of the angled regions is bearable against the first plate of an energy guide chain, wherein the second end regions of the parallel limbs respectively have an opening through which a fixing element is extendable, with which the angled regions are secured to the first and second plate respectively.

24. The roller module according to claim 14, wherein the holding means has a height, and a diameter of the roller is greater than or equal to the height and less than or equal to double the height of the holding means.

25. A roller module for lateral fixing to an energy guide chain having parallel plate rows comprising opposite first plates, wherein at least some of the opposite plates are connected together by transverse limbs, wherein the roller module has a second plate which is suitable for the energy guide chain and a roller mounted in a holding means, wherein the holding means is connected to the second plate and has a fixing means for releasable fixing to a first plate of the first plates of the energy guide chain, that is in opposite relationship to the second plate, and the roller projects beyond the second plate in a direction facing parallel to the second plate, wherein the holding means is in a form of a yoke, with two limbs which are parallel to the second plate and between which the roller is arranged, and which are connected together in a first end region by a connecting limb, wherein the holding means forms a transverse limb which is arrangeable between the first plate of the energy guide chain and the second plate of the roller module.

* * * * *